United States Patent
Cimpu

(10) Patent No.: US 12,207,242 B2
(45) Date of Patent: Jan. 21, 2025

(54) METHOD AND NODE FOR DETERMINING CHANNEL ASSIGNMENT USING AN OBJECTIVE FUNCTION

(71) Applicant: TELEFONAKTIEBOLAGET LM ERICSSON (PUBL), Stockholm (SE)

(72) Inventor: Virgil Cimpu, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1014 days.

(21) Appl. No.: 17/254,096

(22) PCT Filed: Jun. 10, 2019

(86) PCT No.: PCT/IB2019/054827
§ 371 (c)(1),
(2) Date: Dec. 18, 2020

(87) PCT Pub. No.: WO2020/003031
PCT Pub. Date: Jan. 2, 2020

(65) Prior Publication Data
US 2021/0168804 A1    Jun. 3, 2021

Related U.S. Application Data

(60) Provisional application No. 62/691,321, filed on Jun. 28, 2018.

(51) Int. Cl.
*H04W 72/0453* (2023.01)
*H04W 16/14* (2009.01)
*H04W 72/542* (2023.01)

(52) U.S. Cl.
CPC ....... *H04W 72/0453* (2013.01); *H04W 16/14* (2013.01); *H04W 72/542* (2023.01)

(58) Field of Classification Search
CPC ..... H04W 72/04; H04W 72/08; H04W 16/14; H04W 28/16; H04W 72/10; H04W 72/12;
(Continued)

(56) References Cited

U.S. PATENT DOCUMENTS

2015/0029959 A1 * 1/2015 Da .................. H04W 72/541
370/329
2015/0341939 A1 * 11/2015 Sharma ............... H04W 72/542
370/329

(Continued)

FOREIGN PATENT DOCUMENTS

WO   WO-2018087663 A1 *  5/2018  ........... H04B 17/336

OTHER PUBLICATIONS

Xuhang Ying, SAS-Assisted Coexistence-Aware Dynamic Channel Assignment in CBRS Band, May 15, 2018, IEEE Transactions on Wireless Communications ASxIV:1805.06053v1 (Year: 2018).*

(Continued)

*Primary Examiner* — Yu-Wen Chang
(74) *Attorney, Agent, or Firm* — Ericsson Canada Inc.

(57) ABSTRACT

There is provided a method in a controlling node for determining channel assignment for different network nodes. The method comprises: determining a channel assignment based at least on a factor, the factor including one or more of channel usability, contiguous spectrum allocation, spectrum allocation stability and user value; and transmitting the determined channel assignment to a network node.

20 Claims, 6 Drawing Sheets

(58) Field of Classification Search
CPC .......... H04W 72/0453; H04W 72/542; H04W 72/541; H04L 5/00
See application file for complete search history.

(56) References Cited

U.S. PATENT DOCUMENTS

| | | | |
|---|---|---|---|
| 2017/0055268 | A1 | 2/2017 | Aksu |
| 2017/0188241 | A1 | 6/2017 | Mueck |
| 2017/0289733 | A1* | 10/2017 | Rajagopal ............. H04L 5/0082 |
| 2018/0014304 | A1 | 1/2018 | Khoshnevisan |
| 2018/0063844 | A1* | 3/2018 | Khoshnevisan ...... H04W 72/56 |
| 2018/0132111 | A1 | 5/2018 | Mueck et al. |
| 2018/0132112 | A1* | 5/2018 | Khoshnevisan ...... H04W 16/14 |
| 2018/0213407 | A1* | 7/2018 | Miao ..................... H04W 16/10 |
| 2018/0376341 | A1* | 12/2018 | Khoshnevisan ...... H04W 16/12 |
| 2020/0259896 | A1* | 8/2020 | Sachs ................ H04W 56/0065 |
| 2021/0014870 | A1* | 1/2021 | Kim ..................... H04W 16/14 |
| 2022/0053336 | A1* | 2/2022 | Taneja .................... H04L 5/001 |
| 2022/0322367 | A1* | 10/2022 | Beck ..................... H04W 4/023 |

OTHER PUBLICATIONS

Xuhang Ying et al: "SAS-Assisted Coexistence-Aware Dynamic Channel Assignment in CBRS Band", arxiv.org, Cornell University Library, 201 Olin Library Cornell University Ithaca, NY 14853, May 16, 2018 (May 16, 2018), XP080878710, figures 1-8 sections I-VII.
Tseliou, Giorgia, International Search Report for PCT/IB2019/054827, European Patent Office, The Netherlands, Sep. 24, 2019.

* cited by examiner

METHOD AND NODE FOR DETERMINING CHANNEL ASSIGNMENT USING AN OBJECTIVE FUNCTION

RELATED APPLICATIONS

This application claims the benefits of priority of U.S. Provisional Application No. 62/691,321, entitled "Channel Assignment objective function" and filed at the United States Patent and Trademark Office on Jun. 28, 2018, the content of which is incorporated herein by reference.

FIELD

The present description generally relates to methods and apparatus for coexistence management in shared spectrum scenarios.

BACKGROUND

The advance of mobile cellular networks and the popularity of mobile devices combined with the constant growth in user throughput have created a huge demand for one resource: spectrum.

There are three main approaches on spectrum management:

- License the spectrum to operators, who will pay significant fees for the privilege of using dedicated spectrum;
- Unlicensed spectrum where devices are sharing the same spectrum using a set of predetermined rules aimed at insuring fair spectrum access; and
- Shared spectrum, e.g., Licensed Shared Access (LSA) or Authorized shared access (ASA), usually proposing a division of rights of use, based on time of use or geographical constraints between mobile operators and possibly an incumbent user.

This disclosure is concerned with the third (last) approach, which proposes a shared spectrum approach. A typical use of this scenario is to enable use of a band that is available for licensed users in some markets, but is being restricted in others because of incumbents, such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

The introduction of Licensed Shared Access (LSA) in the 2.3 GHz band will allow binary sharing between the incumbent, namely terrestrial radar stations in e.g. France, and LTE with the aid of a spectrum repository known as the LSA repository. Such regulation aims at unlocking spectrum designated as an International Mobile Telecommunications (IMT) band in the International Telecommunications Union (ITU) in markets, and subsequently offered a band designation in 3GPP, namely Band 40.

The creation in USA of the new Citizens Broadband Radio Service (CBRS) in the 3.5 GHz band, currently occupied by incumbents like the Department of Defense, will add much-needed capacity to meet the ever-increasing demands of wireless innovation. The CBRS represents a more aggressive application of ASA to spectrum, where in addition to long-term geographic licenses shared with incumbents, multiple operators may also coexist in close geographical proximity to one another.

Sharing in the 3.5 GHz band occurs between three tiers of users, with higher tiers being accorded lower priority. Access to the spectrum is governed by a Spectrum Access System (SAS) that implements a geolocation database and policy management function to be used to protect incumbents as well as implement a tiered access framework. Incumbent users represent the highest tier in this framework and receive interference protection from Citizens Broadband Radio Service users. Protected incumbents include the federal operations described above, as well as Fixed Satellite Service (FSS) and, for a finite period, grandfathered terrestrial wireless operations in the 3650-3700 MHz portion of the band. The Citizens Broadband Radio Service itself consists of two tiers—Priority Access and General Authorized Access (GAA)—both authorized in any given location and frequency by an SAS. As the name suggests, Priority Access operations receive protection from GAA operations. Priority Access Licenses (PALs), defined as an authorization to use a 10 MegaHertz channel in a single census tract for three years or longer, will be assigned in up to 70 MegaHertz of the 3550-3650 MHz portion of the band. GAA use will be allowed, by rule, throughout the 150 MegaHertz band. GAA users will receive no interference protection from other Citizens Broadband Radio Service users. The band has been designed for deployment of small cells, although there is sufficient capability in the rules to provision wide area macro deployments as well.

FIG. 1 illustrates the spectrum anatomy for the 3.5 GHz Citizens Broadband Radio Service. As can be seen in FIG. 1, the incumbent users of the first tier 100 are the radar users 110 and FSS users 120, for example. PAL 130, GAA 140 and WISPA 150 (Wireless Internet Service Providers Association) users constitute the second tier 160. GAA users 140 also constitute the third tier 170.

A Citizens Broadband radio Service Device (CBSD) will first register with the SAS and provide its location information among other registration parameters, and then it will ask the SAS to grant access in a certain channel. Before granting access, the SAS will use information from the Environmental Sensing Capability (ESC) network to detect incumbent activity in the area where the CBSD operates. The SAS will also use measurement reports from the other CBSDs in the same area to determine the level of interference in a certain channel as well as if the channel needs to be protected due to PAL user activity.

SUMMARY

The introduction of a centralized Spectrum Access System (SAS) in CBRS band, opens the possibility of introducing new coexistence algorithms that are technology neutral. It has been decided that the SAS would calculate a channel allocation and then assign the channel to the CBSDs.

A simple objective function has been used by different SASes to compare different channel allocations.

However, the current objective function is too simple and does not take into consideration different factors such as maximizing channel usability, proximal spectrum allocation, long term spectrum allocation stability, fairness and user value, for example.

Certain aspects and their embodiments of the present disclosure may provide solutions for an objective function that take into account such considerations. The embodiments may be implemented in the centralized Spectrum Access System (SAS) as a logical co-existence manager (CxM) entity or implemented separately from the SAS as a standalone CxM.

According to some embodiments, a method for determining a channel assignment based on factors, such as channel usability, contiguous spectrum allocation, spectrum allocation stability, fairness and user value is disclosed.

According to one aspect, some embodiments include a method performed by a controlling node. The method comprises: determining a channel assignment based at least on a factor, the factor including one or more of channel usability, contiguous spectrum allocation, spectrum allocation stability and user value; and transmitting the determined channel assignment to a network node.

According to another aspect, some embodiments include a controlling node configured, or operable, to perform one or more functionalities (e.g. actions, operations, steps, etc.) as described herein. For example, it can perform the above method.

In some embodiments, the controlling node may comprise one or more communication interfaces configured to communicate with one or more network nodes, and processing circuitry operatively connected to the communication interface, the processing circuitry being configured to perform one or more functionalities as described herein.

In some embodiments, the processing circuitry may comprise at least one processor and at least one memory storing instructions which, upon being executed by the processor, configure the at least one processor to perform one or more functionalities as described herein. For example, the processor is configured to determine a channel assignment based at least on a factor, the factor including one or more of channel usability, contiguous spectrum allocation, spectrum allocation stability and user value; and to transmit the determined channel assignment to a network node.

In some embodiments, the controlling node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the controlling node, configure the processing circuitry to perform one or more functionalities as described herein.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed; these are generally illustrated with dashed lines.

Figure 1:
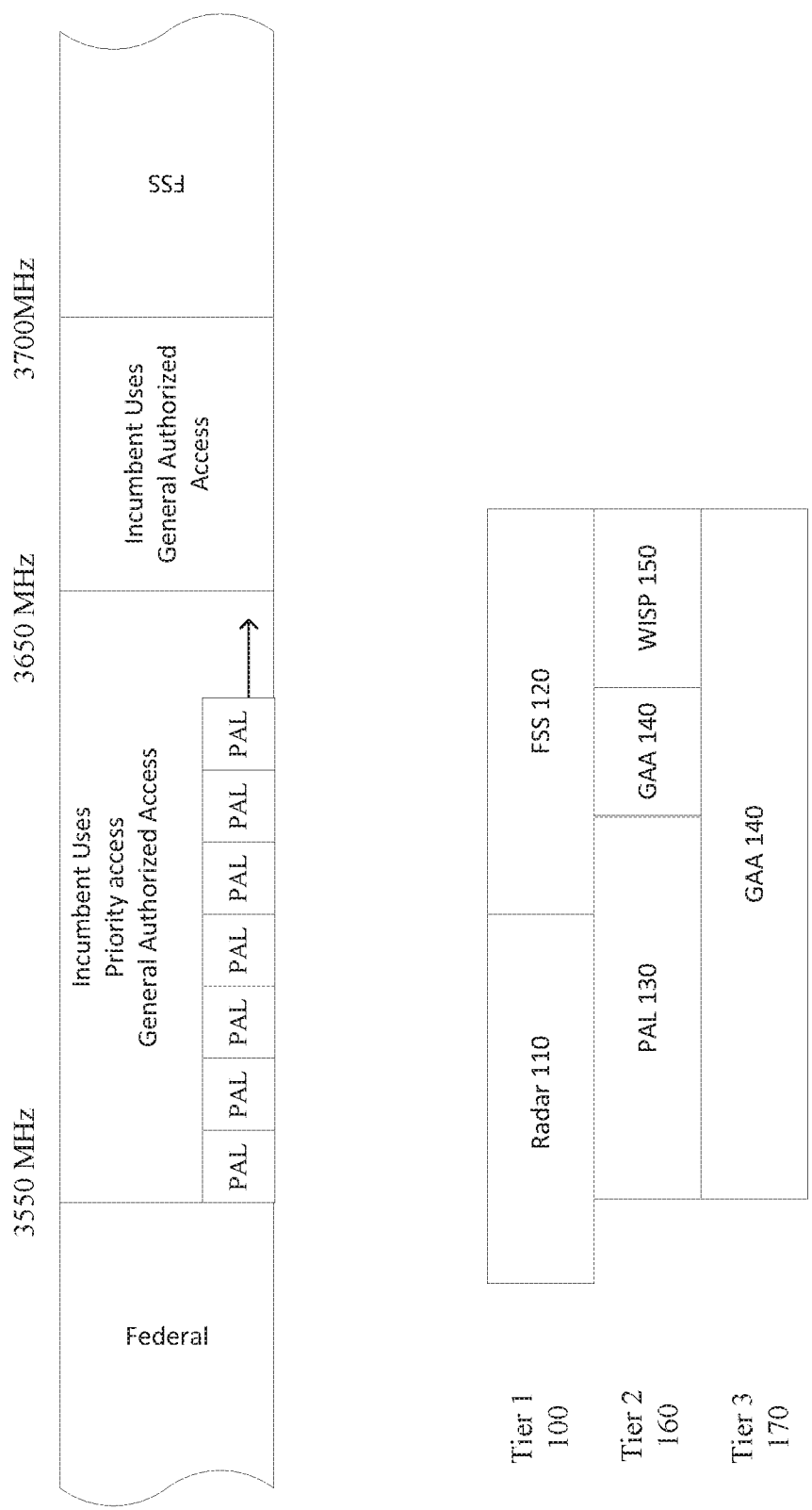
FIG. 1 illustrates the spectrum anatomy for the 3.5 GHz Citizens Broadband Radio Service.
Figure 2:
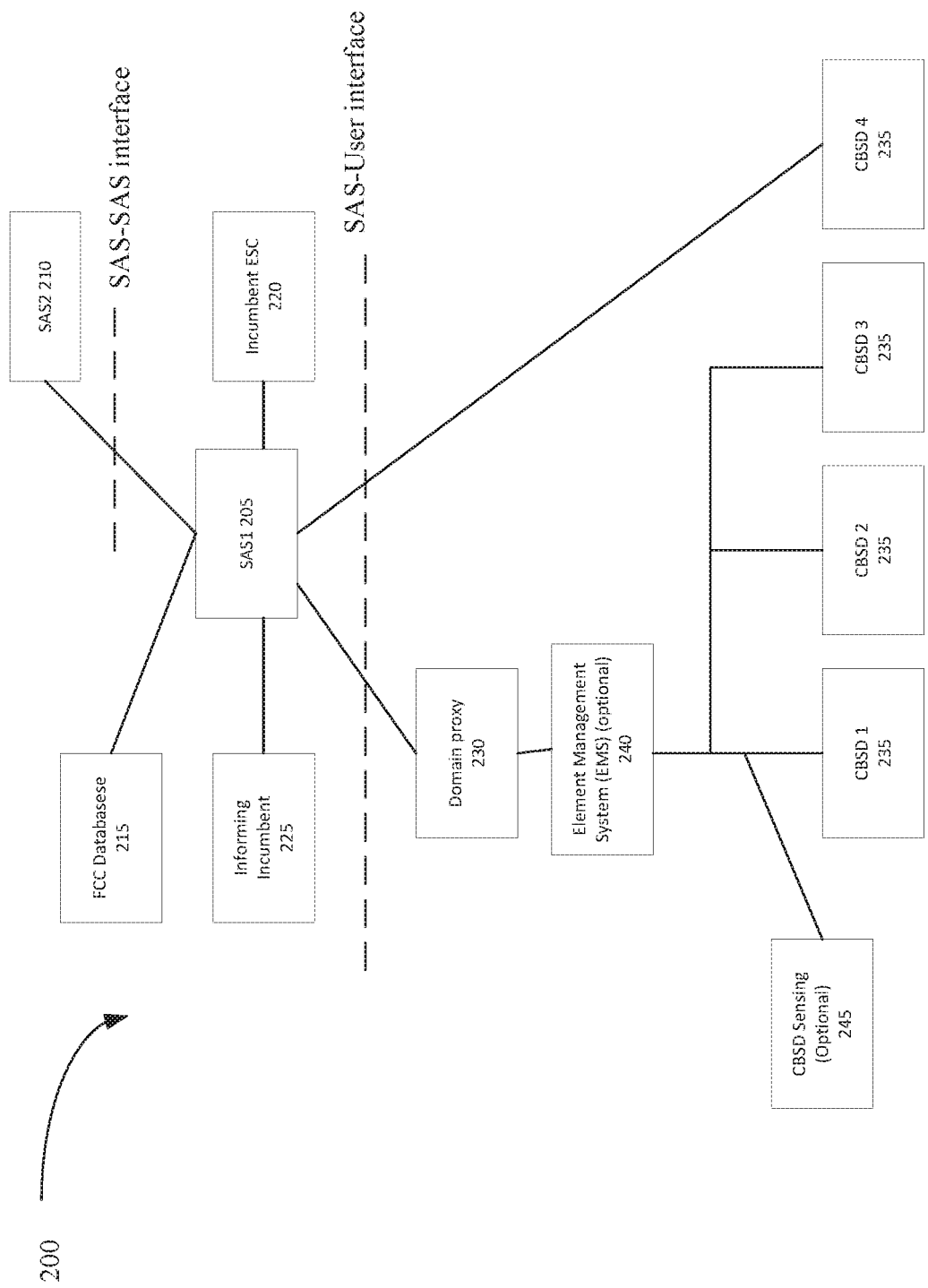
FIG. 2 illustrates the SAS architecture.

The SAS Architecture 200 is depicted in FIG. 2, as proposed by the Federal Communications Commission (FCC) for the 3.5 GHz band. The SAS is a central entity or system for coordinating, authorizing and managing use of the CBRS spectrum, protecting higher tier operations from interference, and maximizing frequency capacity for all CBRS operators. The SAS may be referred to as a controlling node. The SAS administrators will be permitted to charge CBRS operators fees for registration and frequency coordination services. There may be one or more SAS, such as SAS1 205 and SAS2 210 connected to each other.

As illustrated in FIG. 2, for example, SAS1 205 is also connected to FCC databases 215, an Environmental Sensing Capability (ESC) system 220 for incumbent detection, an informing incumbent system 225, a domain proxy 230 and CBSDs 235 (e.g. CBSD4). The Domain Proxy 230 can be optionally connected to an Element Management System (EMS) 240. The EMS 240 can be connected to a plurality of CBSDs 235, such as CBSD1, CBSD2, CBSD3, etc. Each CBSD domain may optionally include some sensing capability systems 245 (e.g. CBSD sensing).

The FCC requires that transmission equipment with specific, standardized capabilities be employed by CBRS operators for use in the 3.5 GHz band. This equipment is called Citizens Broadband Service Device ("CBSD"). CBSDs are fixed base stations/access points, such as an LTE Evolved Universal Terrestrial Radio Access Network (E-UTRAN) Node Bs (also commonly denoted as evolved Node Bs, enhanced Node Bs, eNodeBs, or eNBs) or gNB from New Radio (NR). There are two types of CBDSs: Category A (a lower power CBSD) and Category B (a higher power CBSD). The CBSDs 235 can only operate under the authority and management of a centralized Spectrum Access System.

CBRS end user devices are controlled by an authorized CBSD. End User Devices (EUD) have the capability to receive and decode information from a CBSD. The users access a communication network through one or more CBSDs and, when granted permission from the SAS, use resources within the shared band.

Some of the SAS' functionalities are as follows:
Determine and provide to CBSDs 235 the permissible channels or frequencies at their location.
Determine and provide to CBSDs 235 the maximum permissible transmission power level at their location.
Communicate with the ESC 220 to obtain information about federal Incumbent User transmissions and instruct CBSDs to move to another frequency range or cease transmissions.
Ensure that CBSDs 235 operate in geographic areas and within the maximum power levels required to protect federal Incumbent Users from harmful interference.
Register and authenticate the identification information and location of CBSDs 235.
Ensure that CBSDs 235 protect non-federal Incumbent Users from harmful interference.
Protect Priority Access Licensees from interference caused by other PALs and from General Authorized Access Users.
Facilitate coordination between GAA users operating Category B CBSDs.
Resolve conflicting uses of the band while maintaining, as much as possible, a stable radio frequency environment.
Ensure secure and reliable transmission of information between the SAS and CBSDs.
Protect Grandfathered Wireless Broadband Licensees.
Implement the terms of current and future international agreements as they relate to the Citizens Broadband Radio Service.

The ESC 220 monitors for incumbent radar activity in coastal areas and near inland military bases. For example, the ESC 220 can employ spectrum sensing technologies in conjunction with the SAS, in order to allow CBRS users to operate near coastlines on frequencies not being used by the federal radar systems. When incumbent activity is detected, the ESC 220 communicates that information to SAS1. The SAS or SASs will reconfigure local devices within 300 s to avoid interfering with the detected incumbent radars, for example.

The FCC databases 215 include information related to commercial users and corresponding licenses (e.g., site-based licensing information). SAS1 205 and SAS2 210 are capable of directly interfacing with the FCC databases 215 to access information used for SAS operations.

The Domain Proxy 230 is a managing intermediary. A Domain Proxy's function is to, for example:
Accept a set of one or more available channels and select channels for use by specific CBSDs, or alternatively pass the available channels to the carrier EMS 240 for CBSD channel selection;
EMS 240 may optionally be co-located with the domain proxy 230;
Back report selected channels to SAS optionally received via EMS 240;
Receives confirmation of channel assignment from SAS;
forms bidirectional bulk CBSD registration and directive processing, optionally through carrier EMS if present;
Perform bidirectional information processing and routing;
E.g. interference reporting, etc.

As mentioned above, a SAS can compute, for example every day, a channel allocation/assignment to be provided to the CBSDs. For the next day, the SAS can re-evaluate the channel assignment. In order to determine the channel assignment, an objective function is used to compare different channel assignments so that the determined channel allocation/assignment is the best among all the different possible channel assignments. To do so, the objective function is based on a bandwidth (BD) and a power level (PL), for example the objective function (OF) can be given by: $OF=BD \times PL$. As such, the more bandwidth and power level a channel assignment has, the more valuable (better) this channel assignment is.

However, such an objective function does not take into account other important aspects of channel assignments. Embodiments of the present disclosure provide a method for determining a channel assignment, which takes into consideration different aspects such as:

1) Maximizing Channel Usability:
This aspect allows to assign channels in a way that will allow CBSDs 235 to operate close to the desired power level. In some cases, even though a channel can provide a good output power, some CBSDs, which are in proximity to incumbents (e.g. radar systems or satellite systems) need to reduce their power. Therefore, the channel is not fully usable by the CBSDs. By maximizing the channel usability, the right channel can be allocated to such CBSDs.

2) Contiguous Channel Assignment or Proximal Spectrum Allocation to Meet CBSD Instantaneous BandWidth (IBW) Constraints:
This aspect allows to assign channels that are close to each other to fit within the CBSD IBW. This aspect is important because radio operators' equipment do not have the entire band/spectrum but only a limited IBW to operate. For example, an operator can have equipment (CBSDs) with 60 MHz as its IBW. If it receives a channel outside of this IBW, it cannot use it even though it wants to. Therefore, it is important to receive channel assignments that are contiguous within the IBW.

3) Long Term Spectrum Allocation Stability:
This aspect allows operators to be assigned the same channel over a period of time, instead of changing channel assignment each day for example.

4) Provide High User Value:
The User Value (UV) has been defined in the patent application WO2018/087663, entitled "A method and a controlling node for controlling resources in a shared channel". The User Value allows to make sure that every user has a good Signal-to-interference-plus-noise ratio (SINR) and a good channel to use, in the context of shared spectrum scenarios. For example, the UV function can be a utility function or a metric that expresses the value provided by the CBSD to an end user device present in a certain location. For example, an average of the User Value can be computed as follows. More specifically, the estimated User Value (UV) for a CBSD x in a channel ch is computed according to the following, with reference to FIG. 3.

Figure 3:
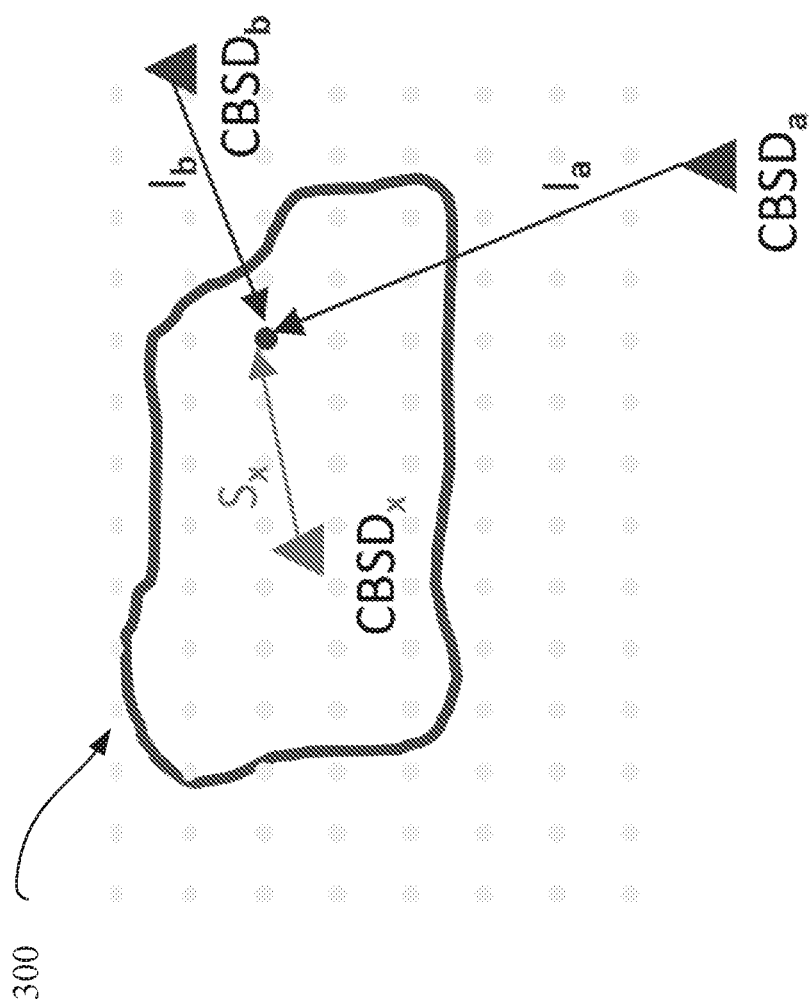
FIG. 3 illustrates a coverage area of a CBSD and the grid points where SINR is computed as part of User Value estimation.

FIG. 3 illustrates a coverage area 300 of the CBSD x, which has CBSD b and CBSD a as neighbors.

The UV is based on SINR, with $$SINR = \frac{S}{I+N},$$

where S is the power of the signal of the serving CBSD, I is the power of the interference and N is the power of the noise.

The SINR can be rewritten in dB as:

$$SINR_{dB} = S_{dB} - N_{dB} - \log_{10}\left(1 + \frac{10^{\frac{I_{dB}}{10}}}{10^{\frac{N_{dB}}{10}}}\right)$$

The UV can be calculated on a grid of points within the coverage 300 of the CBSD x. The calculation includes interference received from the neighbor CBSDs such as CBSD a and CBSD b, within a radius of 40 km from each grid point, for example, operating in the same channel as well as adjacent and alternate channels. Also, only CBSDs that are part of the same connected set are considered.

The Estimated User Value for a CBSD x in a channel ch can be calculated as an average as follows:

$$UV(x,ch) = \text{Average}(SINR_{dB}(p,x,ch))$$

where p are the grid points within the coverage of the CBSD x.

5) Fairness:

This aspect allows to assign the same amount of spectrum to the ICGs, unless overridden by agreements between ICGs, so that there is an equal share of the spectrum among the users. As such, a fairness metric can be developed and used. Other potential use of other fairness metrics can be considered as well.

Furthermore, it should be noted that other factors and considerations can be taken into account when calculating the objective function for channel assignments, as will be appreciated by a person skilled in the art.

In order to consider all the aspects and factors in the objection function, a points system or a weight system can be used and will be described now.

Let's consider CQ(x, ch) as a function that indicates the channel quality for the channel ch if it has been assigned to CBSD x.

For example, if the channel ch is 10 MHz wide, then 5 MHz channels do not get any points.

For example, the function CQ(x, ch) can be based on the following points system:

1) Based on the Desired Power:
   Subtract 10*(Desired_power-IAP_power) points if [Desired_power-IAP_power<=10 dB];
   Subtract 500 points if [Desired_power-IAP_power>10 dB].

2) Based on Allocation Stability:
   Add 10 points if the channel ch was also assigned to CBSD x the day before;
   Add 10 points if the channel ch was also assigned to CBSD x for the last week;
   Add 10 points if the channel ch was also assigned to CBSD x for the last month.

3) Based on Contiguous Allocation:
   Add 25 points if the adjacent channel ch−1 (channel below) is also assigned to CBSD x;
   Add 25 points if the adjacent channel ch+1 (channel above) is also assigned to CBSD x;
   Subtract 25 points if the adjacent channel ch−1 is also assigned to a different CxG (Co-existence Group, which may use a different technology, for example);
   Subtract 25 points if the adjacent channel ch+1 is also assigned to a different CxG;

4) Based on Channel Quality (User Value):
   Add 100 points if estimated User Value>10 for CBSD x in channel ch;
   Add 50 points if estimated User Value is between 5 and 10 for CBSD x in channel ch;
   Add 10 points if estimated User Value>0 for CBSD x in channel ch.

It should be noted that different values for the points can be used. The above points are only examples. Furthermore, a different weight system can be used, which allows to provide more or less weights to the CQ functions depending on different conditions.

The channel quality function (CQ) can be calculated for each channel and each CBSD. Then, the overall objective function can be determined as follows.

For a channel assignment m, the new objective function used to compare the quality of channel assignments is:

$$OF(m) = \Sigma_x \Sigma_{ch} CQ(x,ch)$$

The goal is to maximize this Objective Function. As such, the CxMs shall select a channel assignment m that has the maximum OF(m).

Examples from simulations using the new objective function are given below.

For example, let's suppose there are 6 channels of 10 MHz that are available for CBRS-A of a CxG and 3 CBSDs are in the connected set. Each table (below) shows a particular channel assignment for the 3 CBSDs. The value given by the objection function allows to determine which channel assignment from the 3 tables is to be used, for example.

TABLE 1

| Simulation 1 (S1)- baseline | | | | | | | | | |
|---|---|---|---|---|---|---|---|---|---|
| S1 | Desired EIRP | IAP EIRP | Power Points | ch day before | ch week before | ch month before | Stability Points | ch − 1 same CBSD | ch + 1 same CBSD |
| CBSD1-ch1 | 47 | 40 | −70 | 10 | 10 | 10 | 30 | 0 | 25 |
| CBSD1-ch2 | 47 | 40 | −70 | 10 | 10 | 10 | 30 | 25 | 0 |
| CBSD2-ch3 | 25 | 25 | 0 | 10 | 10 | 10 | 30 | 0 | 25 |

TABLE 1-continued

| Simulation 1 (S1)- baseline | | | | | | | | |
|---|---|---|---|---|---|---|---|---|
| CBSD2-ch4 | 25 | 25 | 0 | 10 | 10 | 10 | 30 | 25 | 0 |
| CBSD3-ch5 | 30 | 30 | 0 | 10 | 10 | 10 | 30 | 0 | 25 |
| CBSD3-ch6 | 30 | 30 | 0 | 10 | 10 | 10 | 30 | 25 | 0 |

| S1 | ch − 1 different CxG | ch + 1 different CxG | Contiguous Allocation Points | UV | UV Points | Cost Function | Objective Function |
|---|---|---|---|---|---|---|---|
| CBSD1-ch1 | −25 | 0 | 0 | 11 | 100 | 60 | 640.00 |
| CBSD1-ch2 | 0 | 0 | 25 | 11 | 100 | 85 | |
| CBSD2-ch3 | 0 | 0 | 25 | 12.5 | 100 | 155 | |
| CBSD2-ch4 | 0 | 0 | 25 | 12.5 | 100 | 155 | |
| CBSD3-ch5 | 0 | 0 | 25 | 9 | 50 | 105 | |
| CBSD3-ch6 | 0 | −25 | 0 | 9 | 50 | 80 | |

TABLE 2

| Simulation 2 (S2) - channels switched to improve power level for CBSD1 | | | | | | | | | |
|---|---|---|---|---|---|---|---|---|---|
| S2 | Desired EIRP | IAP EIRP | Power Points | ch day before | ch week before | ch month before | Stability Points | ch − 1 same CBSD | ch + 1 same CBSD |
| CBSD3-ch1 | 30 | 30 | 0 | 0 | 0 | 0 | 0 | 0 | 0 |
| CBSD1-ch2 | 47 | 40 | −70 | 10 | 10 | 10 | 30 | 25 | 0 |
| CBSD2-ch3 | 25 | 25 | 0 | 10 | 10 | 10 | 30 | 0 | 25 |
| CBSD2-ch4 | 25 | 25 | 0 | 10 | 10 | 10 | 30 | 25 | 0 |
| CBSD3-ch5 | 30 | 30 | 0 | 10 | 10 | 10 | 30 | 0 | 25 |
| CBSD3-ch6 | 47 | 45 | −20 | 0 | 0 | 0 | 0 | 0 | 0 |

| S2 | ch − 1 different CxG | ch + 1 different CxG | Contiguous Allocation Points | UV | UV Points | Cost Function | Objective Function |
|---|---|---|---|---|---|---|---|
| CBSD3-ch1 | −25 | 0 | −25 | 9 | 50 | 25 | 580.00 |
| CBSD1-ch2 | 0 | 0 | 25 | 11 | 100 | 85 | |
| CBSD2-ch3 | 0 | 0 | 25 | 12.5 | 100 | 155 | |
| CBSD2-ch4 | 0 | 0 | 25 | 12.5 | 100 | 155 | |
| CBSD3-ch5 | 0 | 0 | 25 | 9 | 50 | 105 | |
| CBSD3-ch6 | 0 | −25 | −25 | 11 | 100 | 55 | |

TABLE 3

| Simulation 3 (S3) - channels switched to improve power level for CBSD1 | | | | | | | | | |
|---|---|---|---|---|---|---|---|---|---|
| S3 | Desired EIRP | IAP EIRP | Power Points | ch day before | ch week before | ch month before | Stability Points | ch − 1 same CBSD | ch + 1 same CBSD |
| CBSD3-ch1 | 30 | 30 | 0 | 0 | 0 | 0 | 0 | 0 | 25 |
| CBSD3-ch2 | 30 | 30 | 0 | 0 | 0 | 0 | 0 | 25 | 0 |
| CBSD2-ch3 | 25 | 25 | 0 | 10 | 10 | 10 | 30 | 0 | 25 |
| CBSD2-ch4 | 25 | 25 | 0 | 10 | 10 | 10 | 30 | 25 | 0 |
| CBSD3-ch5 | 47 | 47 | 0 | 0 | 0 | 0 | 0 | 0 | 25 |
| CBSD1-ch6 | 47 | 45 | −20 | 0 | 0 | 0 | 0 | 25 | 0 |

| S3 | ch − 1 different CxG | ch + 1 different CxG | Contiguous Allocation Points | UV | UV Points | Cost Function | Objective Function |
|---|---|---|---|---|---|---|---|
| CBSD3-ch1 | −25 | 0 | 0 | 9 | 50 | 50 | 640.00 |
| CBSD3-ch2 | 0 | 0 | 25 | 9 | 50 | 75 | |
| CBSD2-ch3 | 0 | 0 | 25 | 12.5 | 100 | 155 | |
| CBSD2-ch4 | 0 | 0 | 25 | 12.5 | 100 | 155 | |
| CBSD3-ch5 | 0 | 0 | 25 | 11 | 100 | 125 | |
| CBSD1-ch6 | 0 | −25 | 0 | 11 | 100 | 80 | |

It should be noted that in the tables 1 to 3 above, EIRP is the Effective Isotropic Radiated Power and the Cost Function is the same as the channel Quality function (CQ). IAP EIRP is the power level assigned by the SAS to the CBSD after IAP completion. IAP stands for Iterative Allocation Process, and it is done to protect incumbents and higher tier users from interference. IAP happens during CPAS (Coordinated Periodic Activities among SASs) which is a daily midnight activity when SASes exchange information and compute the power reduction required to protect incumbents.

The different tables above show different values given by the objective function (last column). The different values for the objective function can be compared and the best value can be selected. The channel assignment that produced the best value of the objective function can be given to the CBSDs.

For example, in S1 baseline, the Objective function yields 640 points. In this scenario, CBSD1 is assigned to channels ch1 and ch2, CBSD2 is assigned to channels ch3 and ch4 and CBS3 is assigned to channels ch5 and ch6.

In S2, the objective function yields 580 points, which is lower than S1; as such, the channel assignment as shown in S2 should not be used.

In S3, the objective function yields 640 points, which is equal to S1. This channel assignment can be used in order to improve the power for CBSD1. The channel assignment for S3 is as follows: CBSD1 ise assigned to channels ch5 and ch6, CBSD2 isassigned to channels ch3 and ch4, and CBSD3 is assigned to ch1 and ch2.

Since the channel assignment of S3 has the advantage of having higher power gains for CBSD1, the controlling node (CxM or SAS) can decide to use this channel assignment instead of the channel assignment of S1. However, this means that the SAS/CxM needs to implement a change of channel assignment, by removing the existing channel assignment (from S1, for example) and assigning the different channels to the CBSDs according to the channel assignment of S3.

Figure 4:
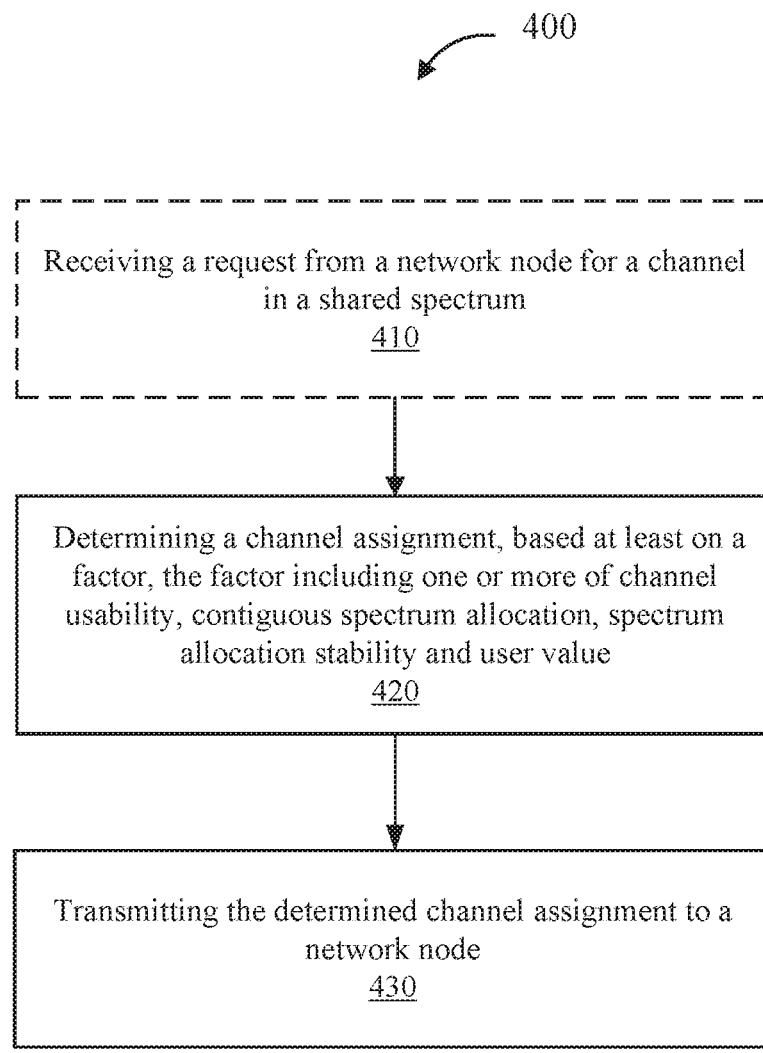
FIG. 4 is a flowchart of a method in a controlling node, according to an embodiment.

FIG. 4 illustrates some embodiments of methods in a controlling node, such as SAS1, for determining a channel assignment and transmitting it to network nodes, in accordance with a first aspect of the present disclosure.

Some embodiments of the method 400 according to this aspect comprise the following steps:
- Step 410 (optional): receiving a request from a network node for a grant of resources (or a channel) in a shared spectrum;
- Step 420: determining a channel assignment, based at least on a factor, the factor including one or more of channel usability, contiguous spectrum allocation, spectrum allocation stability and user value;
- Step 430: transmitting the determined channel assignment to a network node.

The network node is for example a CBSD 235.

In some embodiments, step 420 is performed in response to receiving a request for resources or channel from a network node. In some other embodiments, step 420 is performed by the SAS1 205 without receiving a request for resources from a network node. Indeed, the SAS1 205 can determine the channel assignment as a predefined activity, every day, for example.

In step 420, the channel assignment is determined as explained above, using the new objective function, which takes into account different aspects/factors such as channel usability, contiguous spectrum allocation, spectrum allocation stability, user value and fairness.

In some embodiments, the factor further comprises a fairness metric.

In some embodiments, the determined channel assignment is given by optimizing an objective function.

In some embodiments, the objective function is based on a plurality of channel quality functions.

In some embodiments, the plurality of channel quality functions indicates a quality of a channel based on the factor, the factor including channel usability, contiguous spectrum allocation, spectrum allocation stability and user value.

In some embodiments, the plurality of channel quality functions is determined based on a points system.

In some embodiments, the new objective function comprises the sum of all the weighted quality functions or quality functions resulting from the points system. Other methods can be used to take into consideration the different factors, as well.

In some embodiments, transmitting the determined channel assignment to a network node can comprise assigning one or more channels to the network node based on the determined channel assignment.

Figure 5:
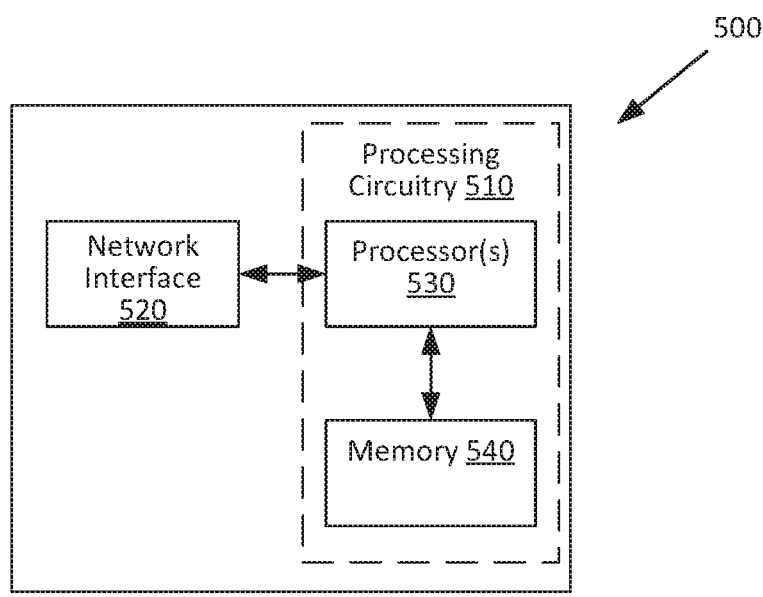
FIG. 5 is a schematic illustration of a controlling node, according to an embodiment.

FIG. 5 is a block diagram of an exemplary controlling node 500, such as SAS1 205, that may be used to determine a channel assignment based on the factors discussed herein. The controlling node 500 includes a processing circuitry 510, and a network interface 520. The circuitry 510 may include one or more (node) processors 530, and memory 540. In some embodiments, the one or more processors 530 executes the method 400 and all embodiments as described above. The memory 540 stores the instructions for execution by the one or more processors 530, and the network interface 520 communicates signals to the other elements, such as the FCC databases, the CBSD, the ESC, the domain proxy, etc.

The one or more processors 530 may include any suitable combination of hardware and software implemented in one or more modules to execute instructions and manipulate data to perform some or all of the described functions of the SAS, such as those described above. In some embodiments, the one or more processors 530 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 530 may comprise one or more of the modules discussed below with respect to FIG. 6.

The memory 540 is generally operable to store instructions, such as a computer program, software, an application including one or more of logic, rules, algorithms, code, tables, etc. and/or other instructions capable of being executed by one or more processors 530. Examples of memory 540 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 520 is communicatively coupled to the one or more processors 530 and may refer to any suitable device operable to receive input for the controlling node 500, send output from the controlling node 500, perform suitable processing of the input or output or both, communicate to other devices, or any combination of the preceding. The network interface 520 may include appropriate hardware (e.g., port, modem, network interface card, etc.) and software, including protocol conversion and data processing capabilities, to communicate through a network.

Other embodiments of the controlling node 500 may include additional components beyond those shown in FIG. 5 that may be responsible for providing certain aspects of a SAS' functionality, including any of the functionality described above and/or any additional functionality (including any functionality necessary to support the solutions described above).

Processors, interfaces, and memory similar to those described with respect to FIG. 5 may be included in other network nodes. Other network nodes may optionally include or not include a wireless interface. Functionalities described could reside within the same node or could be distributed across a plurality of nodes and network nodes.

Figure 6:
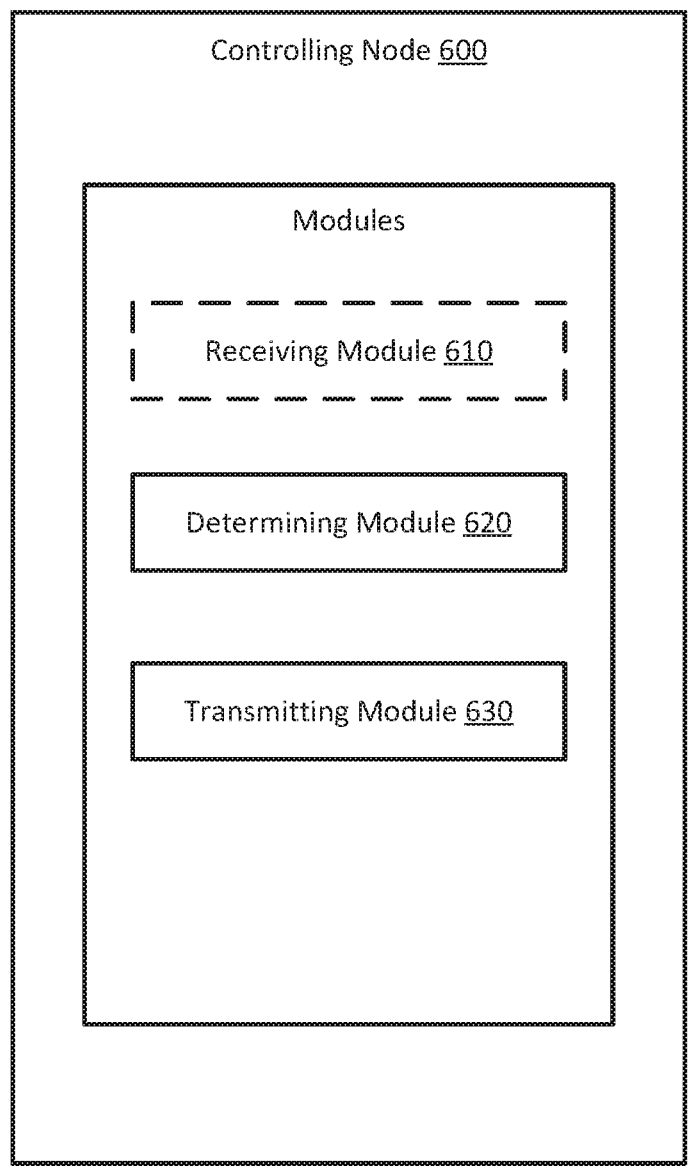
FIG. 6 is a schematic illustration of a controlling node, according to another embodiment.

FIG. 6 illustrates an example of a controlling node 600 in accordance with another embodiment. The controlling node 600 could be a SAS. The controlling node 600 may include a receiving module 610, a determining module 620 and a transmitting module 630.

In certain embodiments, the receiving module 610 may perform a combination of steps that may include steps 410 of FIG. 4.

The determining module 620 may perform a combination of steps that may include steps such as Step 420 of FIG. 4.

In certain embodiments, the transmitting module 630 may perform a combination of steps that may include steps such as Step 430 of FIG. 4.

In certain embodiments, the receiving module 610, the determining module 620 and the transmitting module 630 may be implemented using one or more processors, such as described with respect to FIG. 5. The modules may be integrated or separated in any manner suitable for performing the described functionality.

It should be noted that according to some embodiments, virtualized implementations of the controlling node of FIGS. 5 and 6 and of the CBSDs are possible. As used herein, a "virtualized" network node or controlling node (e.g., a virtualized base station or a virtualized radio access node or a SAS) is an implementation of the network node or controlling node in which at least a portion of the functionality of the network node/controlling node is implemented as a virtual component (e.g., via a virtual machine(s) or container(s) executing on a physical processing node(s) in a network(s)). As such, the functions of the controlling nodes 500 and 600 (described hereinabove) could be distributed across a cloud computing system.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the abbreviations used in this disclosure include:
AAS Active Antenna System
ASA Authorized Shared Access
ARUV Average Relative User Value
CBRS Citizen's Broadband Radio Service
CBSD Citizens Broadband radio Service Device
CxM Co-existence Manager
CxG—Co-existence Group
CSI-RS Channel State Information Reference Signal
ESC: Environmental Sensing Capability
eNB E-UTRAN NodeB
E-UTRAN Evolved UTRAN
UTRAN Universal Terrestrial Radio Access Network
GAA: General Authorized Access
IA Interference alignment
ICIC Inter-cell interference coordination
ICG Interference coordination group
LSA Licensed Shared Access
PAL: Priority Access License
PPA: PAL Protection Area
RAT Radio Access Technology
RSRP Reference Signal Received Power
RSRQ Reference Signal Received Quality
RS-SINR Reference Signal SINR
RUV Relative User Value
SARUV Sum of Relative Average User Values
SAS Spectrum Access System
SINR Signal to Interference plus Noise Ratio
SLNR Signal leakage-to-noise ratio
UV User Value function
gNB Base station in NR
NR New Radio
WISPA Wireless Internet Service Provider Association

What is claimed is:

1. A method in a controlling node, the method comprising:
    determining a plurality of channel assignments using a function that is based at least on a factor, the factor including channel usability, contiguous spectrum allocation, spectrum allocation stability and user value, for a network node to use;
    comparing the determined plurality of channel assignments to determine a channel assignment having the best value of the function; and transmitting the channel assignment having the best value to the network node.

2. The method of claim 1, wherein the controlling node is a spectrum access system.

3. The method of claim 1, wherein the controlling node is a coexistence manager.

4. The method of claim 1, wherein the factor further comprises a fairness metric.

5. The method of claim 1, further comprising receiving a request for resources from the network node.

6. The method of claim 1, wherein determining the plurality of channel assignments comprises optimizing the function.

7. The method of claim 6, wherein the function is based on a plurality of channel quality functions.

8. The method of claim 7, wherein the plurality of channel quality functions indicates a quality of a channel based on the factor, the factor including channel usability, contiguous spectrum allocation, spectrum allocation stability and user value.

9. The method of claim 7, wherein the plurality of channel quality functions is determined based on a points system.

10. The method of claim 7, further comprising applying weights to the plurality of channel quality functions.

11. The method of claim 1, wherein transmitting the channel assignment having the best value comprises assigning one or more channels to the network node based on the channel assignment having the best value.

12. A computer program product comprising a non-transitory computer readable storage medium having computer readable program code embodied in the medium, the computer readable program code comprising computer readable code to perform the steps of:
  determining a plurality of channel assignments using a function that is based at least on a factor, the factor including channel usability, contiguous spectrum allocation, spectrum allocation stability and user value, for a network node to use;
  comparing the determined plurality of channel assignments to determine a channel assignment having the best value of the function; and
  transmitting the channel assignment having the best value to a network node.

13. A controlling node comprising a processing circuitry, the processing circuitry comprising a processor and a memory connected thereto, the memory containing instructions, when executed, cause the processor to:
  determine a plurality of channel assignments using a function that is based at least on a factor, the factor including channel usability, contiguous spectrum allocation, spectrum allocation stability and user value, for a network to use;
  compare the determined plurality of channel assignments to determine a channel assignment having the best value of the function, and
  transmit the channel assignment having the best value to a network node.

14. The controlling node of claim 13, wherein the factor further comprises a fairness metric.

15. The controlling node of claim 13, wherein the processor is further configured to determine the plurality of channel assignments by optimizing the function.

16. The controlling node of claim 15, wherein the function is based on a plurality of channel quality functions.

17. The controlling node of claim 16, wherein the plurality of channel quality functions indicates a quality of a channel based on the factor, the factor including channel usability, contiguous spectrum allocation, spectrum allocation stability and user value.

18. The controlling node of claim 16, wherein the plurality of channel quality functions is determined based on a points system.

19. The controlling node of claim 16, wherein the processor is configured to apply weights to the plurality of channel quality functions.

20. The controlling node of claim 13, wherein the processor is further configured to assign one or more channels to the network node based on the channel assignment having the best value.

* * * * *